INVENTOR.
WILLIS O. UNRUH
BY Charles J. Ungemach
ATTORNEY

United States Patent Office 3,422,686
Patented Jan. 21, 1969

3,422,686
OPTICAL PICKOFF MEANS FOR DERIVING SIGNALS INDICATIVE OF DEVIATION OF ROTOR POLE FROM SPIN AXIS
Willis O. Unruh, Clearwater, Fla., assignor to Honeywell Inc., Minneapolis, Minn., a corporation of Delaware
Filed Aug. 15, 1966, Ser. No. 572,375
U.S. Cl. 74—5.6
Int. Cl. G01c *19/28*
3 Claims

ABSTRACT OF THE DISCLOSURE

Light reflected from an optically flat surface at the end of a rotor spin axis and from the area adjacent the surface is transduced into electrical signals for comparison with reference signals derived from reference indication elsewhere on the surface for obtaining a signal indicative of the position of the spin axis relative to the rotor supporting means.

---

This invention pertains to means for sensing and measuring the attitude of a rotating body and more specifically the inclination of the spin axis of a rotor which is universally supported and adapted to spin about a spin axis. This invention has specific application to the field of gyroscopic instruments.

Briefly, the present invention comprises optical pickoff means disposed near the pole of the rotor so as to reflect light off of an optical flat formed on the rotor. This flat has a normal which is slightly inclined with respect to the spin axis so that the reflected light sweeps in a cone and traces an annular image at an image plane. The position of this annular image is indicative of the inclination of the spin axis. When the spin axis leaves a predetermined attitude by a large amount so that the annular image is no longer useful, my invention operates to provide additional information by monitoring the light reflected from the spherically shaped rotor surface.

It is an object of the invention, therefore, to provide an improved control apparatus and more specifically to provide an inexpensive pickoff for measuring the inclination of the spin axis of a universally supported spinning sphere.

A further object of the present invention is to provide pickoff means having a dual operating range so as to provide a capability for measuring small and large inclinations of the spin axis.

Other and more specific objects of the invention, including constructional details, will be set forth more fully in the following specification and appended claims, in conjunction with the accompanying drawings in which:

Figure 1:
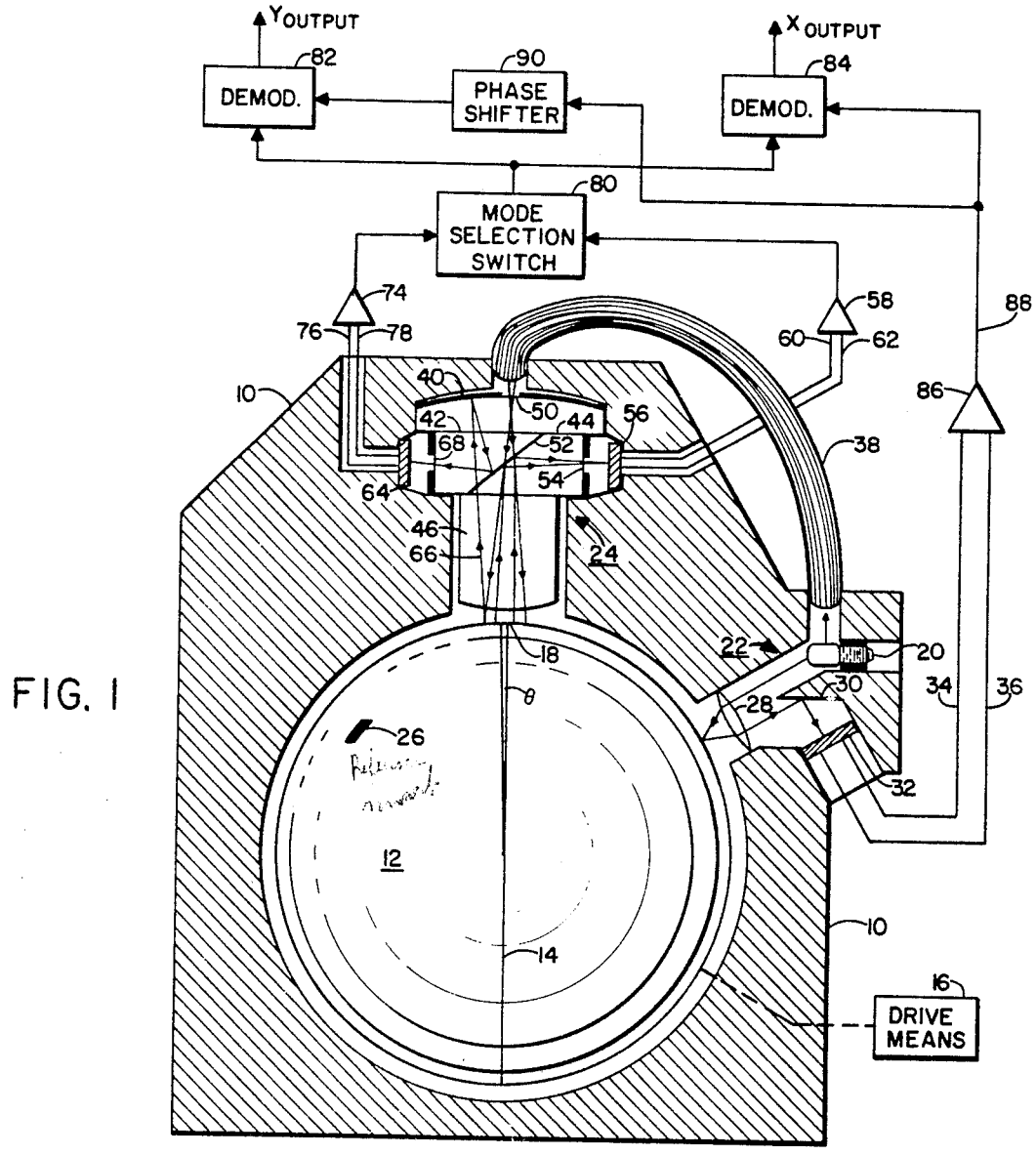
FIGURE 1 is a schematic drawing of a section of a gyroscopic instrument demonstrating the configuration and operation of my invention.

Referring to FIGURE 1, a housing 10 is shown which is adapted to contain and universally support a spherical rotor 12. Rotor 12 is caused to rotate about a spin axis 14 by a drive means 16 which drive means may be magnetic or fluid or any other means well known to those skilled in the art. At one end of the spin axis a small optically flat surface is formed designated in FIGURE 1 by the number 18. This flat surface is not perpendicular to spin axis 14. The normal to flat surface 18 is inclined with respect to the spin axis by a small angle $\theta$. In the preferred embodiment it has been found that a suitable size for the optical flat is approximately $1/10$ of 1 inch in diameter for a 1 inch diameter rotor. In addition it has been found convenient to make $\theta$ equal to approximately 17 arcminutes although the above dimensions may be readily altered and are not intended to limit the present invention.

In order to achieve low power consumption and a compact size only a single light source 20 is used in the preferred embodiment. Light source 20 is used to provide illumination for a reference pickoff means generally indicated by the number 22 and the spin axis measuring means generally indicated by the number 24. The reference pickoff means will be described first.

A suitable low reflectance reference mark 26 is applied to the rotor in order to provide the desired reference signal. Although only a single reference marking is shown in the preferred embodiment any pattern may be used to provide a reference signal. In fact, any mechanism operable to provide a reference signal indicative of the position of the rotating sphere is suitable for the purposes of this invention. An optical pickoff is used in the preferred embodiment because it is readily compatible with the polar spin axis pickoff. However, it is not intended that the invention be limited to the use of an optical reference pickoff except when so defined in the claims.

In operation, light from source 20 is focused directly on the rotor surface by means of a lens 28. Light reflected from the rotor returns through lens 28 where it is reflected off of a reflective surface 30 and received by a detector 32. Detector 32 may be a photosensitive field effect transistor or any other suitable light measuring device operable to produce a signal on wires 34 and 36 indicative of the passage of reference mark 26 under lens 28.

Light from source 20 is also directed into a fiber optics bundle 38. Bundle 38 transmits the light to the top of support 10 where it is projected down through a number of solid optical elements onto rotor 12 and flat 18. Four optical elements numbered 40, 42, 44, and 46 comprise the spin axis pickoff 24. Curved surfaces are formed on the top of element 40 and on the bottom of element 46. In addition the top of element 40 is coated so as to be internally reflecting and also provide a small circular aperture 50 at the center. Elements 42 and 44 are coated on their vertical faces so as to provide two small circular apertures 68 and 54 in their centers. The 45 degree faces of elements 42 and 44, which face each other, form a beam splitter to both pass and reflect the light beam. The bottom surface of element 46 is curved by the proper amount so that light from fiber optics bundle 38 which passes through aperture 50 in element 40 is collimated and projected directly onto the flat surface 18. The reflected light from flat 18 is directed by beam splitter 52 onto circular aperture 54. The light that passes through aperture 54 is measured by a detector 56 and the signal therefrom is presented to an AC amplifier 58 by means of two lead wires 60 and 62. Detector 56 may be the same as detector 32 or any other type of detector suitable to measure light intensity. Since flat 18 is not perpendicular to the spin axis but rather slightly tilted, as the rotor turns about spin axis 14, the reflected beam of light does not fall directly on aperture 54 but rather traces an annular image thereon. This may be more clearly demonstrated with respect to FIGURE 2.

Figure 2:
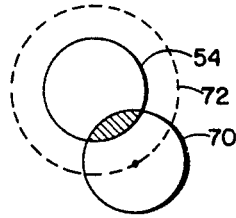
FIGURE 2 is a diagram showing the path followed by the reflected beam of light when the spin axis of the rotor is in a predetermined position.

In FIGURE 2 it may be seen that an annular image is formed when the circular image from the beam of light, indicated by the circle 70, is swept in a circular path indicated by the dashed lines 72. When the spin axis of the rotor is correctly aligned in a predetermined position the reflected beam sweeps in a conical manner tracing an annular image which is concentric with the circular aperture 54 as shown in FIGURE 2. The amount of light that pases through aperture 54 is shown by the shaded area. Since circular image 70 travels around the edge of circular aperture 54 this shaded area remains constant, that is, the amount of light passing through aperture 54 remains constant so that detector 56 presents a constant voltage to amplifier 58. However, a different situation prevails when the spin axis leaves the predetermined inclination. This is better illustrated by FIGURE 3.

Figure 3:
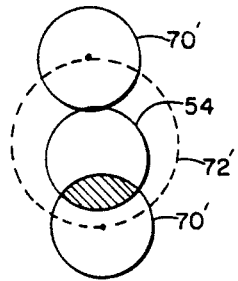
FIGURE 3 is a diagram showing the path of the light beam reflected from the rotor when the spin axis has left the predetermined position.

In FIGURE 3 it can be seen that, as rotor 12 spins about an inclined axis, the reflected beam from flat 18 is still swept in a conical manner to trace an annular image. But this annular image is no longer concentric with circular aperture 54. The center of light image 70' follows the circular path shown by dashed line 72' sinusoidially directing more and less light through aperture 54 to detector 56 when the spin axis is slightly inclined with respect to the predetermined position. The more the rotor axis is inclined the greater the fluctuation in the amount of light passing through aperture 54 with the signal becoming less sinusoidal in nature for larger inclinations. Consequently, it may be seen that amplifier 58 will receive an AC signal which has an amplitude proportional to the amount of inclination of the spin axis of the rotor and a phase indicative of the direction of inclination of the spin axis.

Referring again to FIGURE 3 it may be seen that when the spin axis becomes sufficiently inclined the annular image traced by light image 70 will no longer pass across aperture 54. In this situation the signal from detector 56 is no longer useful. In this situation the present invention may be switched so as to utilize a detector 64.

When the spin axis is sufficiently inclined light is reflected from the spherical surface of the rotor as well as from the flat 18. This spherical surface acts as a diverging optical element so that light from fiber optics bundle 38 is not reflected back along its path but rather follows the path indicated by the numeral 66 in FIGURE 1. The light is reflected back to the top surface of element 40 where it is reflected to beam splitter 52 and, thence, through aperture 68 to detector 64. Detector 64, which may be the same as detector 56, measures the amount of light passing through aperture 68 which light includes all that reflected from the spherical rotor surface and a very small amount of the reflection from the flat surface. In this mode the light beam at aperture 68 does not sweep in a conical manner and, therefore, the illumination of detector 64 is fairly constant. However, since flat 18 is slightly displaced from the spin axis 14 it will oscillate in and out of the field of view of detector 64 thus increasing and decreasing the amount of spherical surface reflecting light onto detector 64. Thus the light impinging on detector 64 will vary in intensity sinusoidally at a frequency identical to that of the rotor frequency. The output of detector 64 is presented to an AC amplifier 74 by means of a pair of leads 76 and 78. The output from AC amplifier 74 has a relatively constant amplitude signal over a substantial range of inclination of the rotor spin axis and a phase indicative of the direction of inclination. The output from amplifier 74 is thus seen to be useful for acquisition and coarse tracking of the rotor spin axis position.

For the purposes of this application sufficient circuitry is shown to provide direct current output signals indicative of the inclination of the spin axis in two directions, here called the $x$ and $y$ direction. It should be understood that the circuitry shown in FIGURE 1 represents one possibility only and that many other techniques may be employed. In FIGURE 1 a mode selection switch 80 which may be manual or automatic operates to select either the fine tracking signal from amplifier 58 or the coarse tracking signal from amplifier 74. This signal is then demodulated by a pair of demodulators 82 and 84 which compare the signal to the reference signal on detector 32 which is received by means of an amplifier 86 and a lead 88. The signal may be demodulated directly with the reference signal to determine the amount of inclination in one direction. This demodulation is performed by demodulator 84 to determine the $x$ output. In order to determine the inclination of the axis in the $y$ direction, orthogonal to the $x$ direction, it is necessary to demodulate the signal with the reference signal shifted by 90 degrees in phase. This shift is accomplished by phase shifter 90. A more complete analysis of the signal analyzing circuitry of FIGURE 1 may be had by reference to FIGURE 10 of my Patent No. 3,239,673 filed Apr. 30, 1963.

Many variations may be made to the present invention without departing from the novel concept disclosed. Thus, I do not intend to limit the invention to the embodiment shown except as defined in the appended claims.

I claim:
1. Apparatus to measure the position of the spin axis of a spinning body relative to means supporting the body comprising in combination:
 a flat reflecting surface on the body at one end of the spin axis, said surface having a normal which is inclined with respect to said spin axis, and reference indications elsewhere on said body;
 means projecting a beam of light to said surface so that the reflected beam sweeps in a conical manner at the frequency of rotation of the body so as to trace an annular image at an image plane, said projecting means including a first optical system mounted on said supporting means operable to project light toward the flat surface and to receive the reflected light and further operable to divide the reflected light into first and second paths, said first path leading to an aperture in said image plane and said second path leading to a first detector, so that said first detector will measure the intensity of light reflected from the spinning body, which intensity varies by an amount substantially dependent on the amount of the flat surface in the field of view; and measuring means for determining the position of said annular image in said image plane as an indication of the position of said spin axis including said aperture in the image plane so positioned that the annular image traced by the conically sweeping beam is substantially concentric therewith when the spin axis is in a predetermined position, a second detector located so as to receive light passing through said aperture which light is of a constant intensity when the spin axis is in the predetermined position but of a periodically varying intensity when the spin axis is not in the predetermined position, the phase and magnitude of said variation being indicative of the position of the spin axis relative to the predetermined position means for deriving reference signals from said reference indications indicative of the rotational phase of the spinning body, and means for demodulating signals from said first and second detectors with said reference signals for generating output signals.
2. The apparatus of claim 1 wherein said reference means comprises a second optical system having a source of light adapted to reflect off of the rotating body, which body has reference markings thereon, and a third detector adapted to receive the reflections so as to provide said reference signal.
3. The apparatus of claim 2 including a fiber optics bundle positioned so as to conduct light from said source of light to said projecting means.

References Cited
UNITED STATES PATENTS

| | | | |
|---|---|---|---|
| 3,071,976 | 1/1963 | Kunz | 250—231 X |
| 3,239,673 | 3/1966 | Unruh | 250—233 X |
| 3,277,304 | 10/1966 | Vyce | 250—230 |
| 3,313,161 | 4/1967 | Nordsieck | 74—5.6 |
| 3,355,953 | 12/1967 | Johnson | 74—5.6 X |

ROBERT SEGAL, *Primary Examiner.*

U.S. Cl. X.R.

250—203, 230